US010377053B1

(12) United States Patent
Bisso, IV et al.

(10) Patent No.: US 10,377,053 B1
(45) Date of Patent: *Aug. 13, 2019

(54) CUTTING APPARATUS AND METHOD

(71) Applicant: BISSO MARINE, LLC, Houston, TX (US)

(72) Inventors: William A. Bisso, IV, Tomball, TX (US); Tjerko Jurgens, Deurningen (NL)

(73) Assignee: BISSO MARINE, LLC, New Orleans, LA (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/231,271

(22) Filed: Aug. 8, 2016

Related U.S. Application Data

(63) Continuation-in-part of application No. 13/915,383, filed on Jun. 11, 2013, now Pat. No. 9,409,305, which is a continuation of application No. 12/825,565, filed on Jun. 29, 2010, now Pat. No. 8,464,621.

(51) Int. Cl.
*B26D 1/547* (2006.01)
*B23D 61/18* (2006.01)
*B23D 57/00* (2006.01)
*E02D 9/04* (2006.01)

(52) U.S. Cl.
CPC ......... *B26D 1/547* (2013.01); *B23D 57/0084* (2013.01); *B23D 61/185* (2013.01); *E02D 9/04* (2013.01)

(58) Field of Classification Search
CPC .. B23D 61/18; B23D 61/185; B23D 57/0084; B26D 1/547; B27B 33/14–148; E02D 9/04
See application file for complete search history.

(56) References Cited

U.S. PATENT DOCUMENTS

| | | |
|---|---|---|
| 1,736,607 A | 11/1929 | Legge |
| 2,049,172 A | 7/1936 | Osgood |
| 2,473,104 A | 6/1949 | Lefevre |
| 3,661,137 A | 5/1972 | Prowse et al. |
| 3,741,192 A * | 6/1973 | Avery ................ B23D 61/185 125/21 |
| 3,910,147 A | 10/1975 | Heyerdahl |
| 4,258,763 A | 3/1981 | Figueredo et al. |

(Continued)

FOREIGN PATENT DOCUMENTS

| | | |
|---|---|---|
| KR | 10-0898151 | 5/2009 |
| WO | WO 03/009960 | 6/2003 |

*Primary Examiner* — Kenneth E Peterson
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

A plurality of bushings are coupled to one another via a series of bolts to provide an interlocking, articulating cutter. The bolts have a cylindrical end and a convex end. The convex ends are seated inside a concave socket coupled to the bushings. The cylindrical ends are coupled to a convex nut seated inside another concave socket coupled to an adjacent bushing. The convex ends of the bolts are configured to articulate inside the seat of the concave sockets. A washer may be placed between the bushings to provide a desired amount of flexibility and/or rigidity. The outer surface of the bushing comprises a cutting structure, such as a milled or clad cutting structure.

25 Claims, 21 Drawing Sheets

(56) References Cited

U.S. PATENT DOCUMENTS

| | | | |
|---|---|---|---|
| 4,674,474 A * | 6/1987 | Baril | B23D 61/185 |
| | | | 125/18 |
| 4,793,232 A | 12/1988 | Villemin et al. | |
| 4,856,490 A * | 8/1989 | Kawase | B23D 61/185 |
| | | | 125/21 |
| 7,373,935 B2 | 5/2008 | Lawler et al. | |
| 9,409,305 B2 | 8/2016 | Bisso et al. | |
| 9,827,690 B2 * | 11/2017 | Zhang | B23D 61/185 |
| 10,138,685 B1 * | 11/2018 | Eggers | E21B 11/06 |
| 2011/0072944 A1 | 3/2011 | Eggers | |

* cited by examiner

US 10,377,053 B1

CUTTING APPARATUS AND METHOD

CROSS-REFERENCE TO RELATED APPLICATIONS

This is a continuation-in-part of U.S. patent application Ser. No. 13/915,383, filed 11 Jun. 2013, which is a continuation of U.S. patent application Ser. No. 12/825,565, filed 29 Jun. 2010 (now U.S. Pat. No. 8,464,621, issued on 18 Jun. 2013), each of which is hereby incorporated herein by reference and priority to/of each of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates generally to cutters and, more particularly, to a cutter comprising interlocking, articulating cutting bushings adapted to actuate in a back and forth saw-like motion to cut a desired structure.

2. General Background of the Invention

In conventional marine salvage operations, given the size of some structures, it is sometimes necessary to remove the structure in a piecemeal fashion. Thus, various cutting methods have been employed. One such method involves the use of a wire having a plurality of loose bushings slidable along the wire. The wire is actuated in a back and forth saw-like motion to cut the desired structure. Another method involves the use of a chain which is actuated back and forth to cut the structure.

These methods have a variety of disadvantages. In the first method, the bushings are not attached to one another. Therefore, in instances when the wire breaks during operations, bushings simply slide off the wire into the surrounding water. As a result, costly retrieval operations must be conducted, or bushings have to be replaced. In methods employing the chain, cutting operations are extremely violent since the chain really does not cut the structure, but rather "tears" it, resulting in a very jagged "cut" and a dangerous working environment. In addition, since adjacent links in the chain are oriented along planes which are perpendicular to one another, every other link bears the majority of the cutting stresses, resulting in a less efficient cutting operation with greater safety risk to personnel and equipment.

Accordingly, there is a need in the art for a cutter having interlocking, articulating bushings, therefore providing a means to achieve a safer, efficient, and cost-effective marine salvage operation.

BRIEF SUMMARY OF THE INVENTION

The present invention provides apparatuses and methods for a cutting apparatus comprising interlocking, articulating cutting bushings. A plurality of bushings is coupled to one another via a series of bolts. The bolts have a cylindrical end and a convex end. The convex ends are seated inside a concave socket coupled to the interior bore of the bushings. The cylindrical ends are threaded to a convex nut which seats inside another concave socket coupled to the bore of an adjacent bushing. The convex ends of the bolts are configured to articulate inside the seat of the concave sockets, thereby allowing the bushings to articulate in relation to one another. A hardened or flexible washer may be placed between the bushings to provide a desired amount of flexibility and/or rigidity. The outer surface of the bushing comprises a cutting structure, such as a milled or clad cutting structure.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Illustrative embodiments and methodologies of the present invention are described below as they might be employed in a cutter or method employing the cutter. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and methodologies of the invention will become apparent from consideration of the following description and drawings.

Figure 1A:
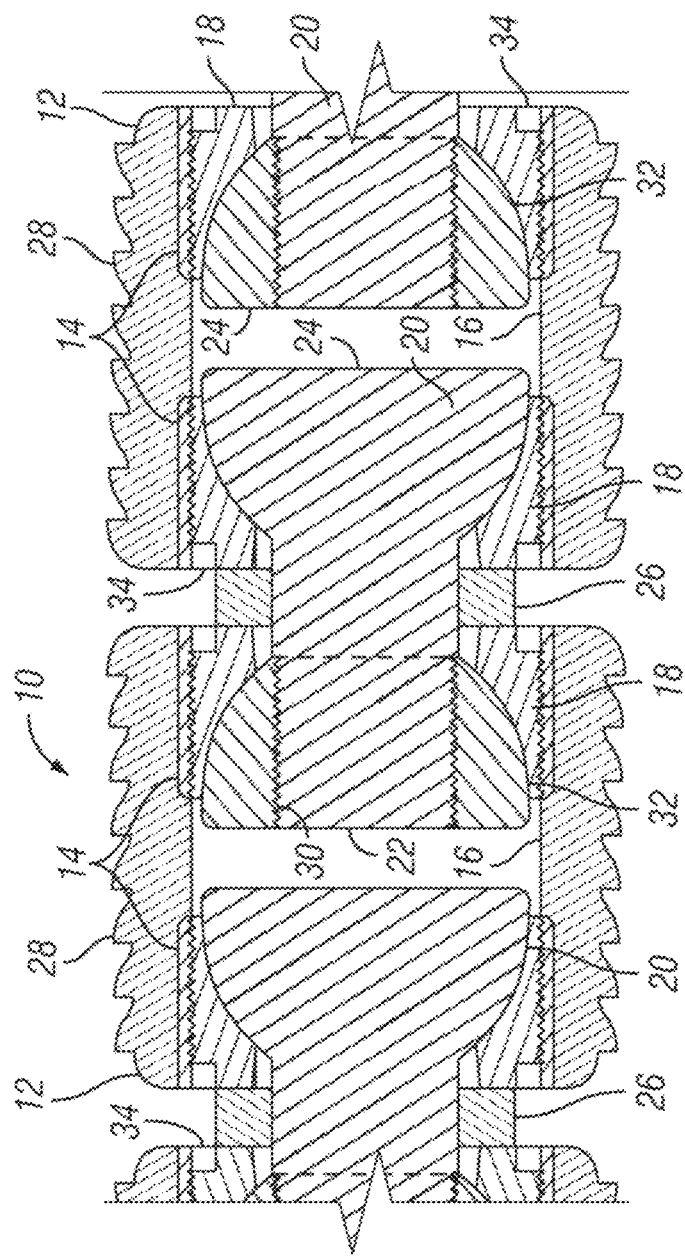
FIG. 1A is a sectional view of a cutter according to an exemplary embodiment of the present invention.

FIG. 1A illustrates a cutter according to an exemplary embodiment of the present invention. Cutter 10 includes a plurality of bushings 12 having milled cutting surfaces along the outer diameter. In this exemplary embodiment, bushings 12 are approximately 60 mm long by 80 mm in diameter, however, those ordinarily skilled in the art having the benefit of this disclosure realize the dimensions of bushings 12 may be varied. Threads 14 are present along inner bore 16 of bushings 12 at each end of bushings 12. An interior concave socket 18 having a threaded outer diameter is threadingly coupled to threads 14 of bushings 12.

A convex shouldered bolt 20 is positioned inside interior concave socket 18. At one end of convex shouldered bolt 20 is a cylindrical end 22, while the other end comprises the convex end 24. Convex end 24 seats inside concave interior socket 18 such that convex shouldered bolt 20 is allowed to articulate a certain degree, as will be discussed later. End 22 of convex shouldered bolt 20 comprises threads 30 along its outer diameter. A convex nut 32 is threadingly coupled to convex shoulder bolt 20 via threads 30. Convex nut 32 seats inside concave interior socket 18 of the adjacent bushing 12. Accordingly, any number of bushings 12 may be coupled to each other in such manner.

Further referring to the exemplary embodiment of FIG. 1A, once positioned inside bore 16 of bushing 12, the outer end of concave interior socket 18 rests substantially flush with the end of bushing 12. A washer 26 is positioned around convex shouldered bolt 20 between adjacent bushings 12 in order to provide rigidity to cutter 10. Washer 26 may be made of metallic or non-metallic material, such as, for example, rubber, neoprene, or polyethylene. In this exemplary embodiment, washer 26 is approximately 8 mm thick by 40 mm in diameter. Depending on the width of washer 26, the outer ends of concave interior sockets 18 of adjacent bushings 12 either rest against or are adjacent to the ends of washer 26 when cutter 10 is in a substantially straight position.

In embodiments utilizing a hardened washer 26, cutter 10 will be more rigid and, thus, will flex less, or not at all, during cutting. However, in embodiments utilizing a flexible washer 26, cutter 10 will be flexible and have more ability to articulate. Those ordinarily skilled in the art having the benefit of this disclosure realize the material used in washer 26 and/or the size of washer 26 may be varied to accomplish a variety of angles of curvature or rigidity within cutter 10. Moreover, in order to provide maximum flexibility, an alternate exemplary embodiment of the present invention omits washer 26 altogether. In addition, cutter 10 may comprise a combination of hardened, flexible, and omitted washers in order to achieve the desired cutter characteristics.

Figure 1B:
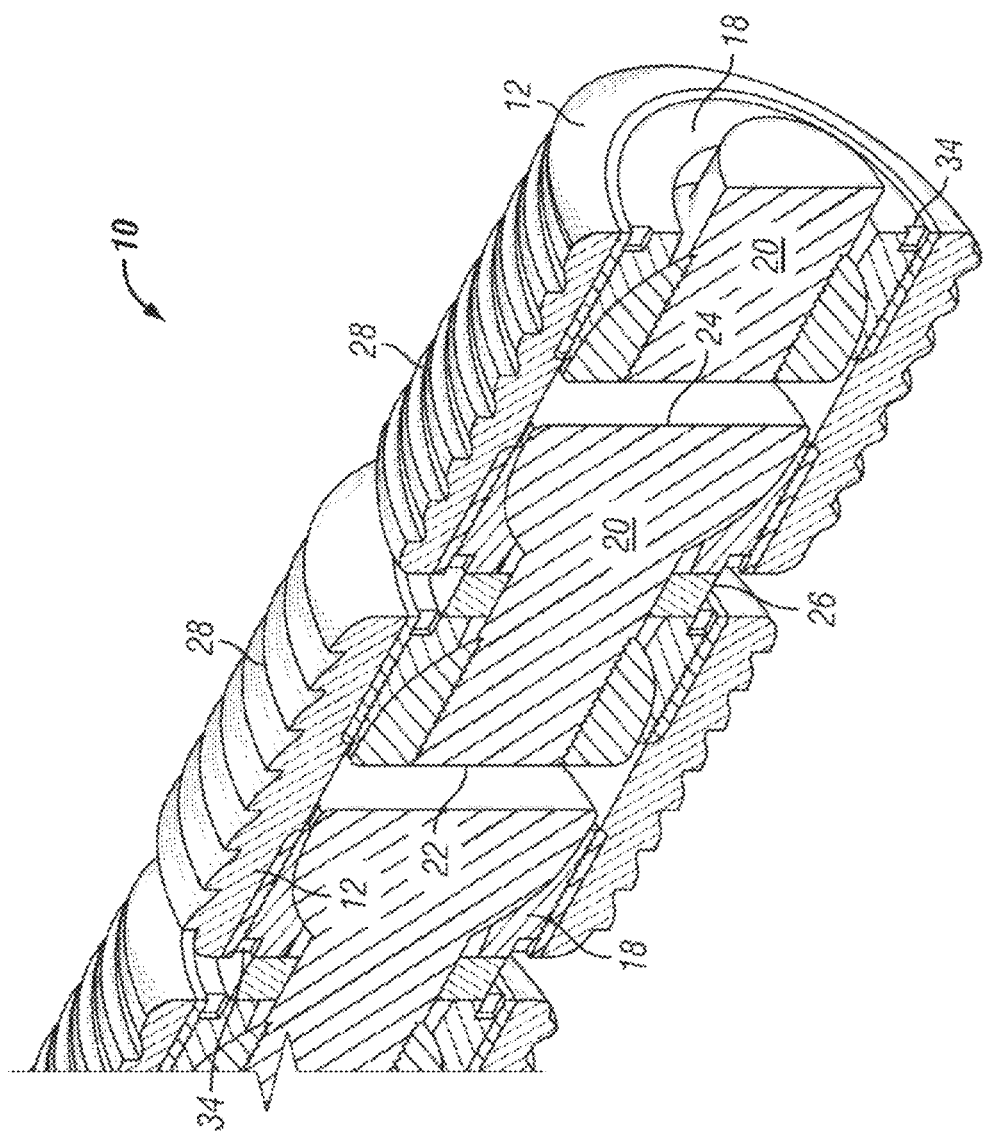
FIG. 1B is an alternate view of the cutter illustrated in FIG. 1A.
Figure 2:
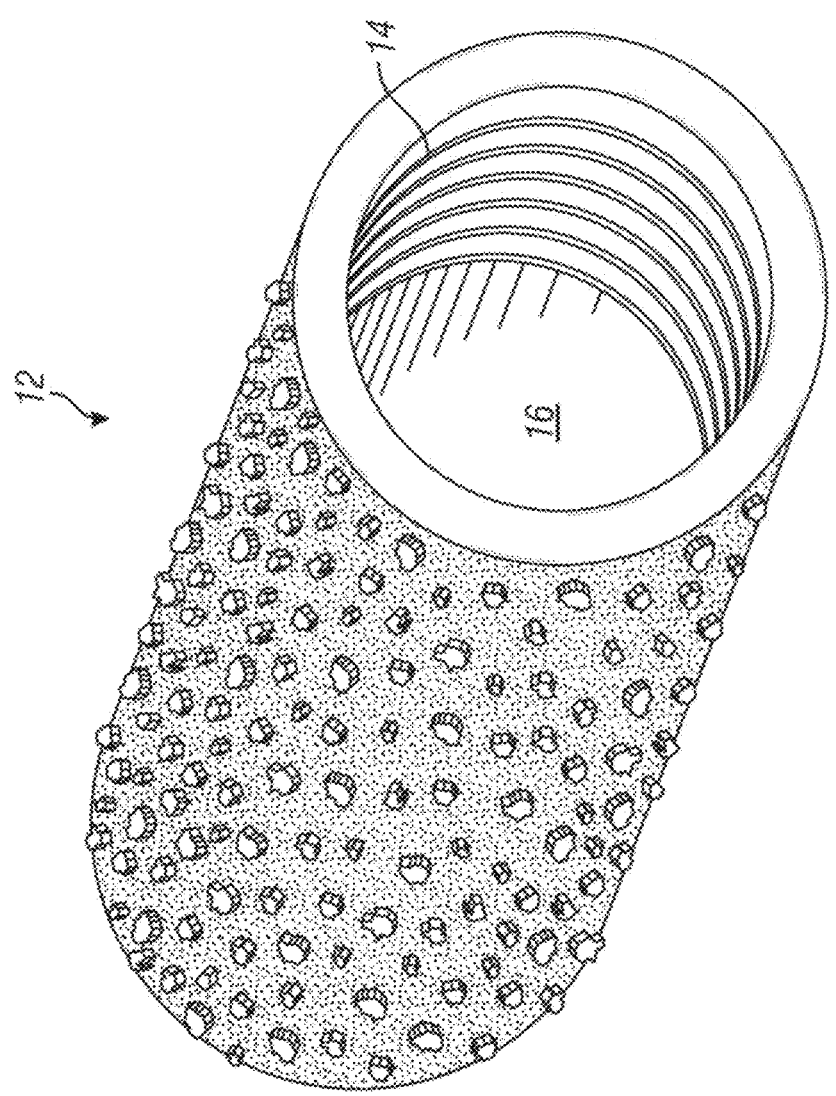
FIG. 2 illustrates a clad bushing of a cutter according to an exemplary embodiment of the present invention.

The exemplary cutter 10 of FIG. 1A comprises a milled outer surface composed of teeth 28 which are circumferentially placed around the outer surface of bushing 12. The respective teeth 28 of adjacent bushings 12 are oriented in opposing directions of each other. As illustrated in FIG. 1, the cutting surfaces of teeth 28 along the left bushing 12 are all oriented toward the left, while teeth 28 along adjacent right bushing 12 are oriented in the right direction. As such, cutter 10 cuts in both directions as it is actuated. FIG. 1B is an alternative view of FIG. 1A. In the alternative exemplary embodiment of FIG. 2, bushing 12 may comprise a variety of clad cutting surfaces, such as tungsten carbide, polycrystalline diamond compact, diamond, or other cutting surfaces, or some combination of cutting surfaces. In yet another exemplary alternate embodiment, teeth 28 of a single bushing may be oriented in opposing directions as well.

Assembly of cutter 10 will now be described in relation to an exemplary embodiment of the present invention. When assembling cutter 10, convex interior socket 18 is threadingly coupled to threads 14 of a first bushing 12. Concave interior socket 18 comprises pin holes 34 in its outer surface. A pin wrench, as known in the art, is utilized to screw concave interior socket 18 into threads 14. Thereafter, convex shouldered bolt 20 is seated inside concave interior socket 18. A washer 26, if desired, followed by a second concave interior socket 18 are slid over end 22 of shouldered bolt 20. Convex nut 32 is then threaded onto end 22 via thread 30 and then inserted into the second bushing. The second concave interior socket 18 is then coupled to the second bushing 12 into threads 14.

Now two bushings 12 have been coupled to each other, and each bushing has an open end ready to receive further sockets 18 and bolts 20. Thus, a second convex shouldered bolt 20 is seated in a concave interior socket 18 and, then, threaded (via pin holes 34 and pin wrench) into one of the open ends of the first or second bushings 12. Any number of bushings may be added to cutter 10 in like manner. Disassembly of cutter 10 would be achieved in a reverse manner, as would be apparent to one ordinarily skilled in the art having the benefit of this disclosure. Although not shown, end 24 of convex shouldered bolt 20, as well as the inner end of convex nut 32, also comprise pin holes 34 which are utilized with the pin wrench in assembly/disassembly.

Figure 3A:
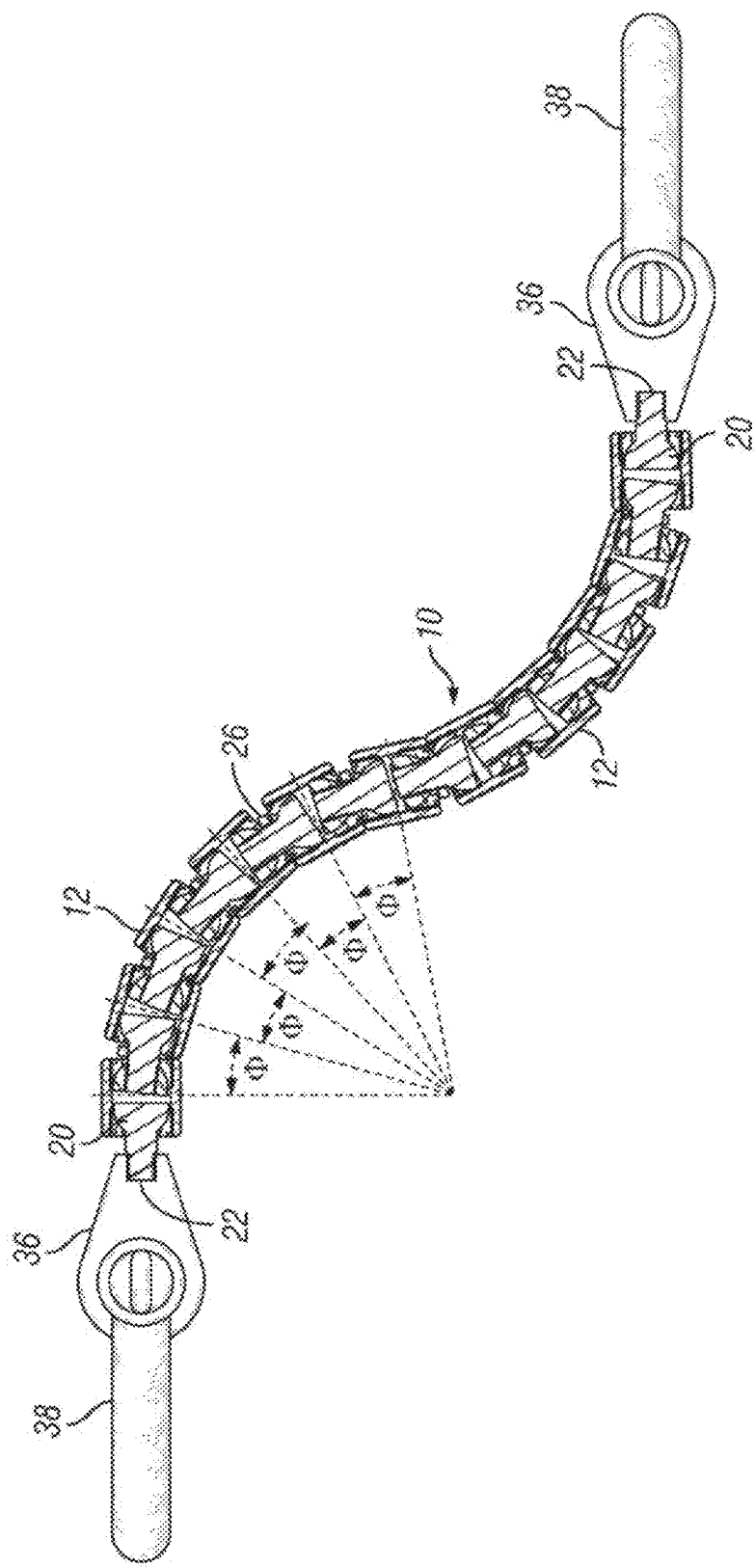
FIG. 3A is an expanded view of a cutter according to an exemplary embodiment of the present invention.
Figure 3B:
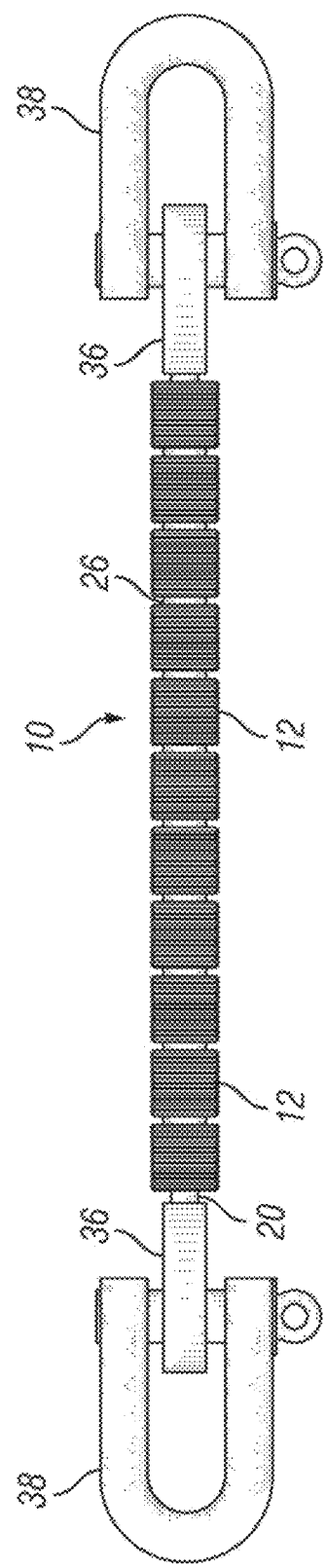
FIG. 3B is an alternate view of the cutter illustrated in FIG. 3A.

FIGS. 3A & 3B illustrate expanded views of cutter 10 according to an exemplary embodiment of the present invention. Here, cutter 10 comprises the same components previously described in relation to FIGS. 1A & 1B. Moreover, any number of bushings 12 may comprise cutter 10, as desired. At each end of cutter 10, the outermost bushings 12 comprise convex shouldered bolt 20 having cylindrical end 22 and convex end 24. In this exemplary embodiment, however, unlike the other convex shouldered bolts 20, cylindrical end 22 of the outermost convex shouldered bolt 20 is threadingly coupled to a threaded pad eye receiver 36 and a shackle or clevis 38. An exemplary shackle is disclosed in U.S. Pat. No. 7,654,594, entitled "SHACKLE," issued Feb. 2, 2010, owned by the Assignee of the present invention, Bisso Marine Co., Inc. of Houston, Tex., which is hereby incorporated by reference in its entirety. An actuator 40 is coupled to shackle 38. Actuator 40 may be a hydraulic unit operated by a programmable power unit, such as a constant tension winch or hydraulic ram, or any other means known in the art.

Figure 4A:
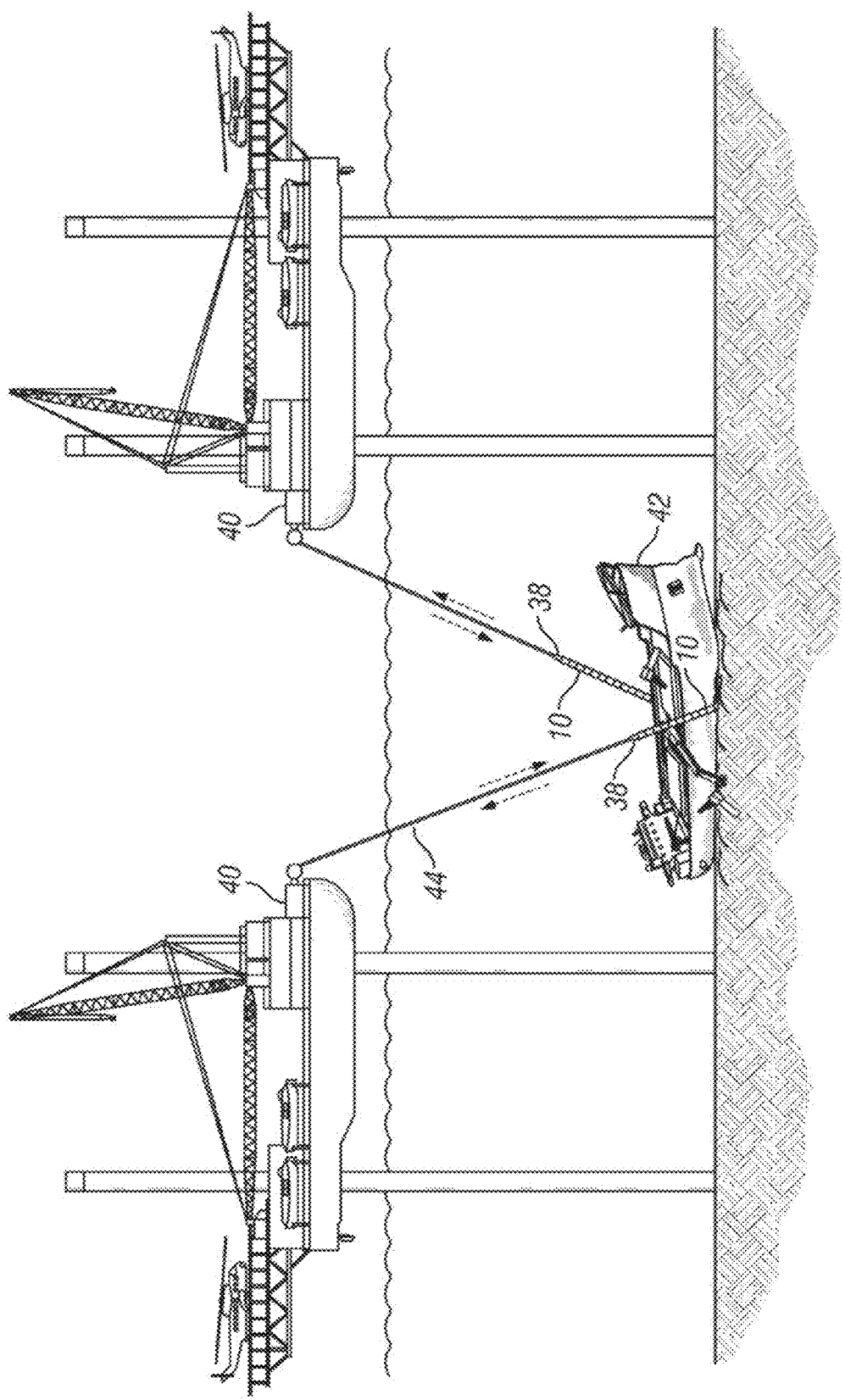
FIG. 4A illustrates the vertical operation of the cutter according to an exemplary embodiment of the present invention.
Figure 4B:
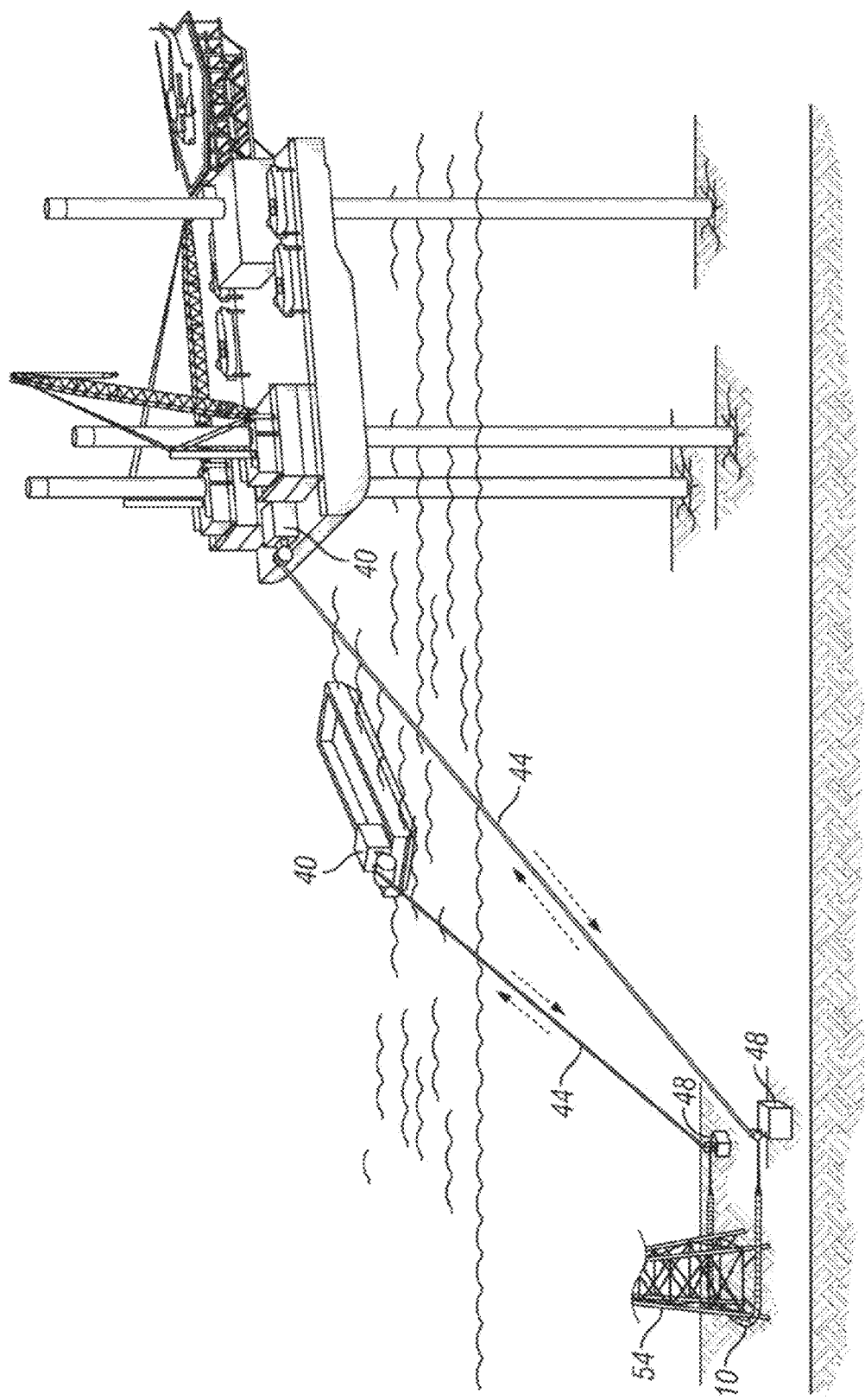
FIG. 4B illustrates the horizontal operation of the cutter according to an exemplary embodiment of the present invention.
Figure 5A:
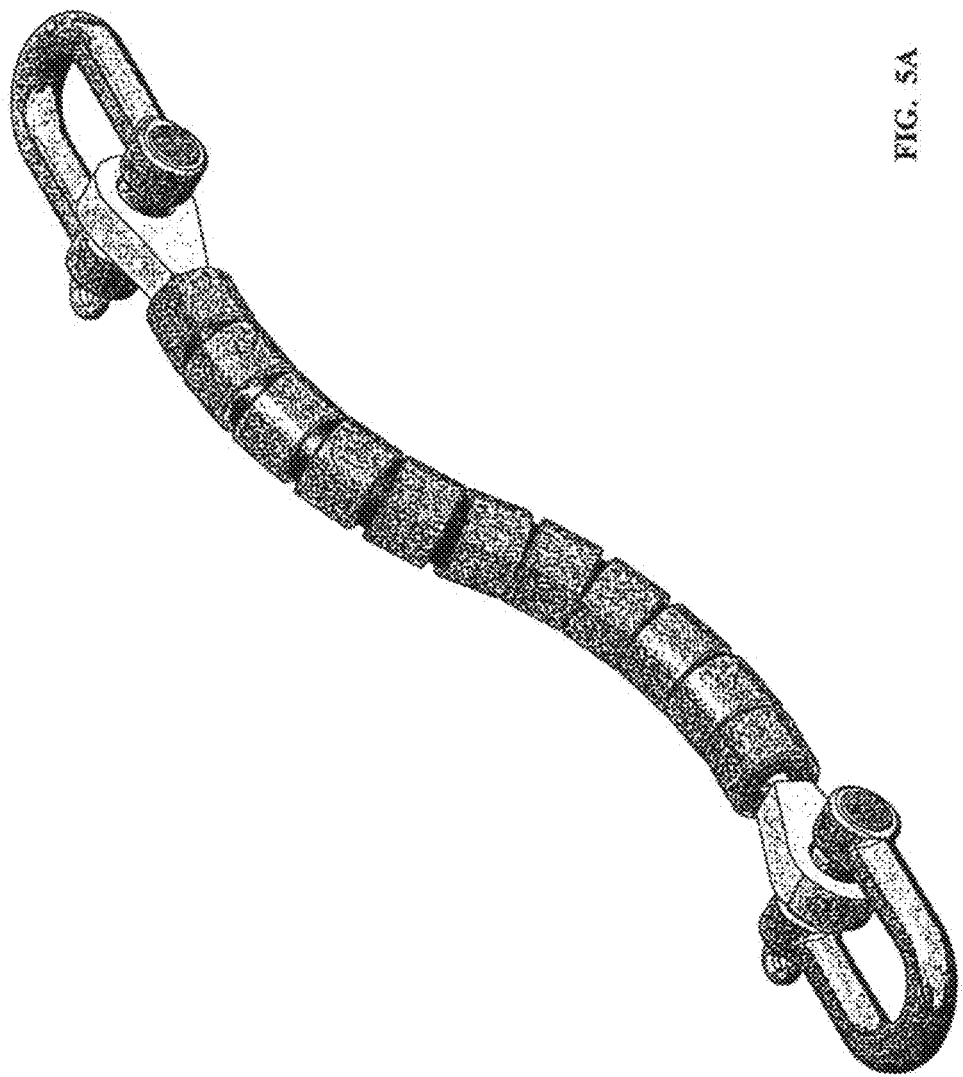
FIG. 5A illustrates an isometric view of a cutter according to an embodiment of the current invention.
Figure 5B:
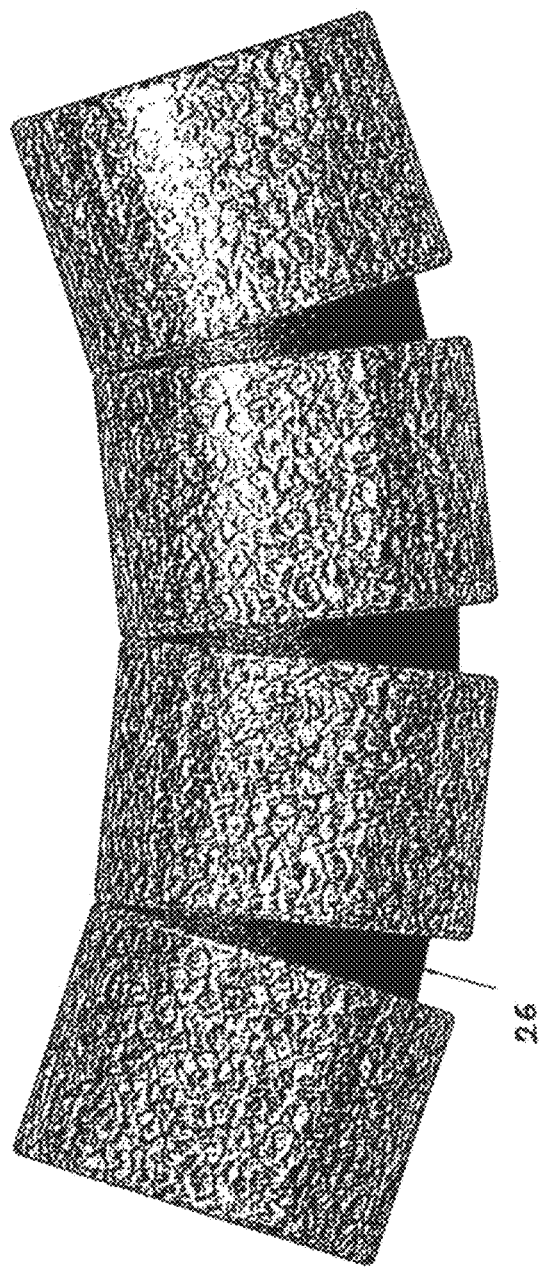
FIG. 5B shows a cutter with a flexible washer.
Figure 5C:
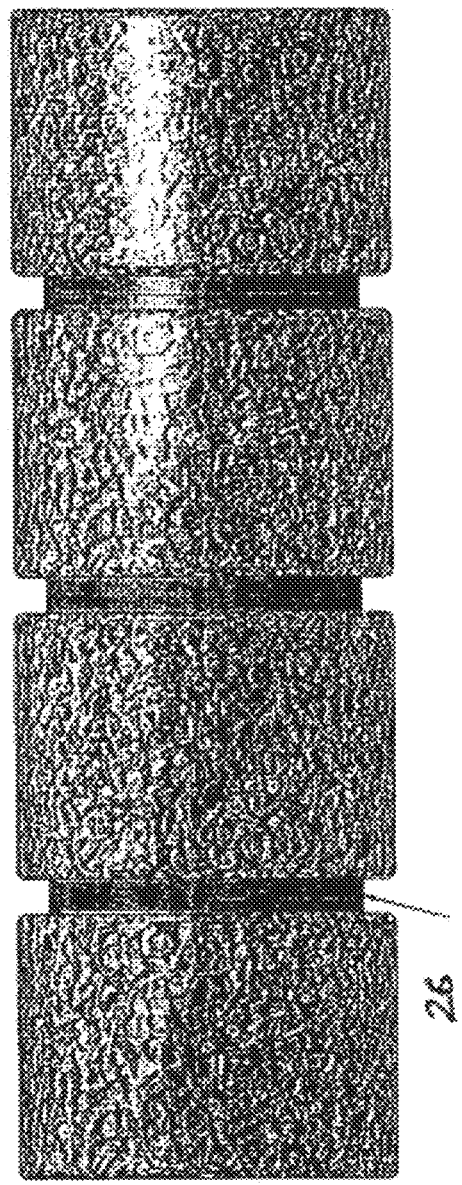
FIG. 5C depicts a cutter with a rigid washer.
Figure 5D:
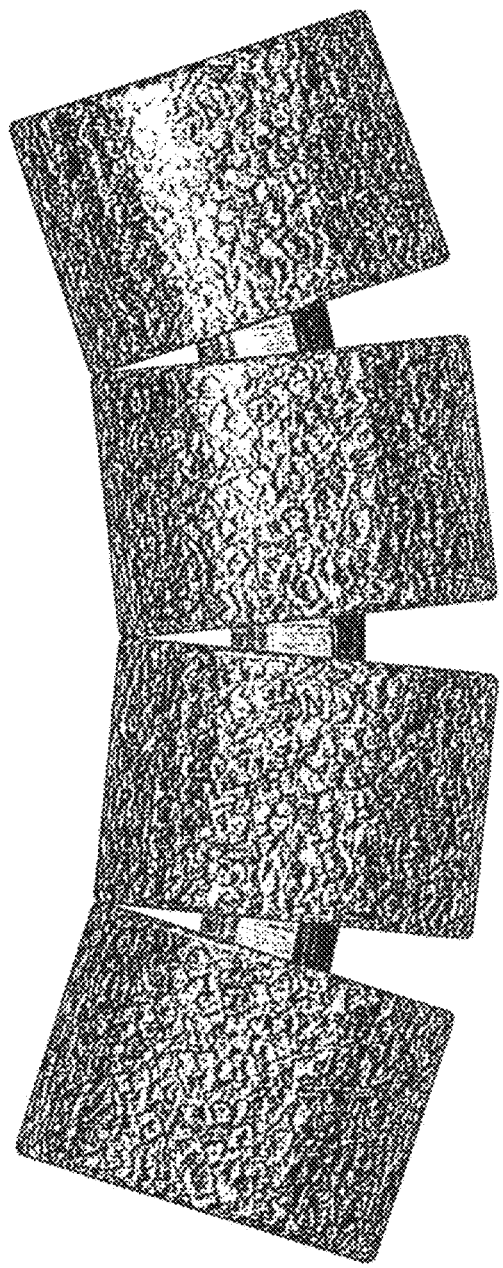
FIG. 5D illustrates a cutter without any washers.
Figure 5E:
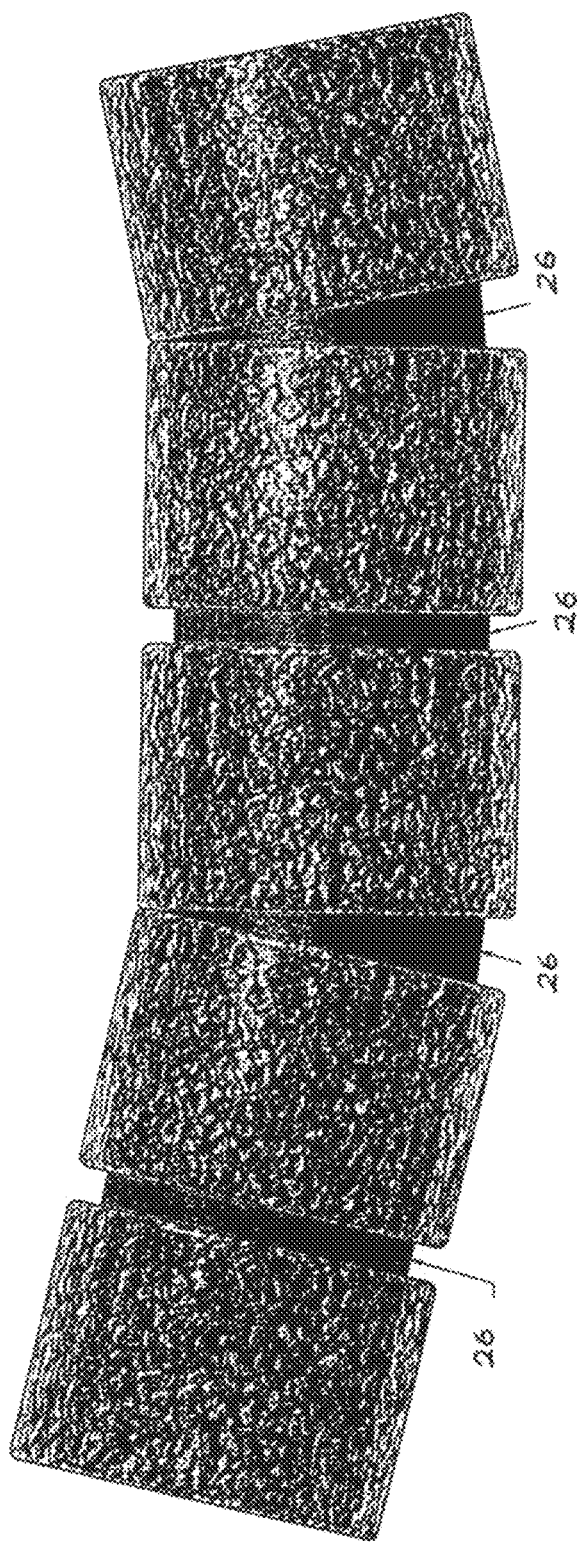
FIG. 5E depicts a cutter with a mixture of rigid and flexible washers.
Figure 5F:
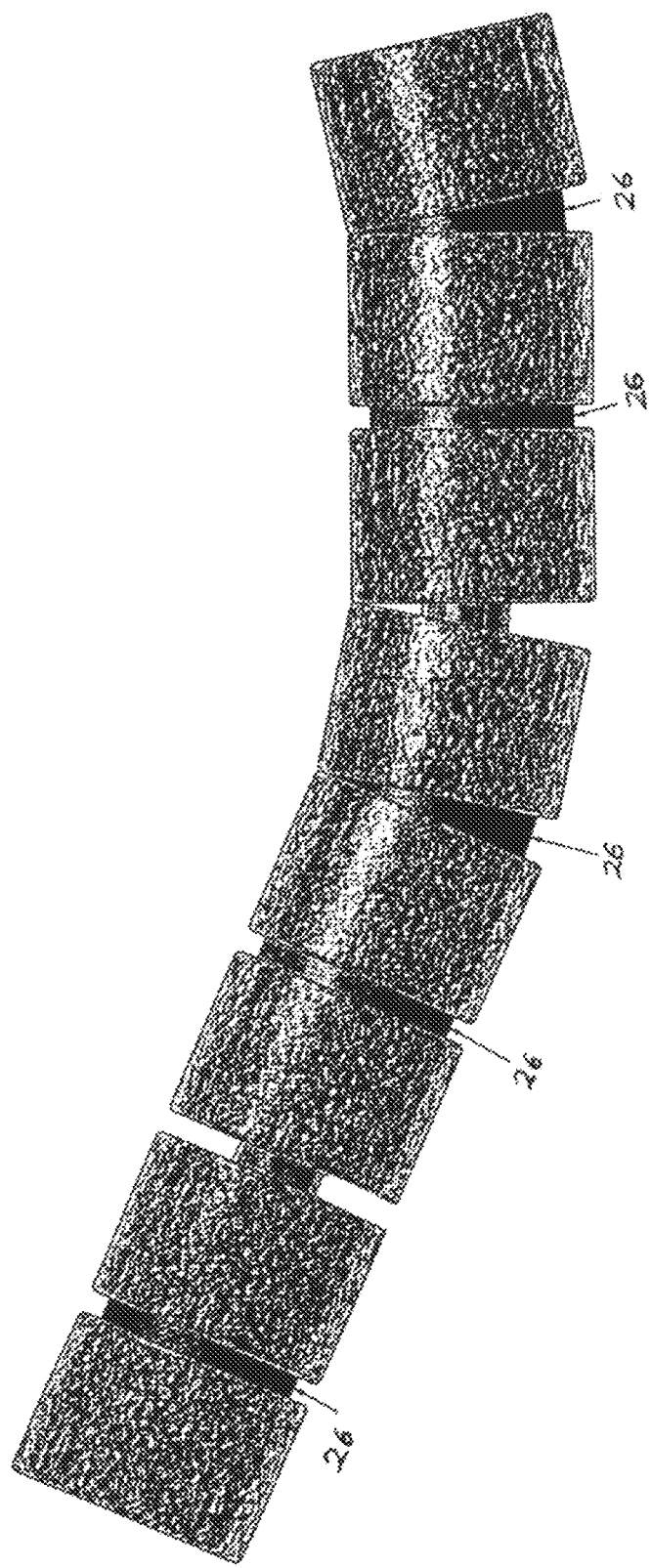
FIG. 5F illustrates a cutter with a mixture of flexible, rigid and no washers.
Figure 6:
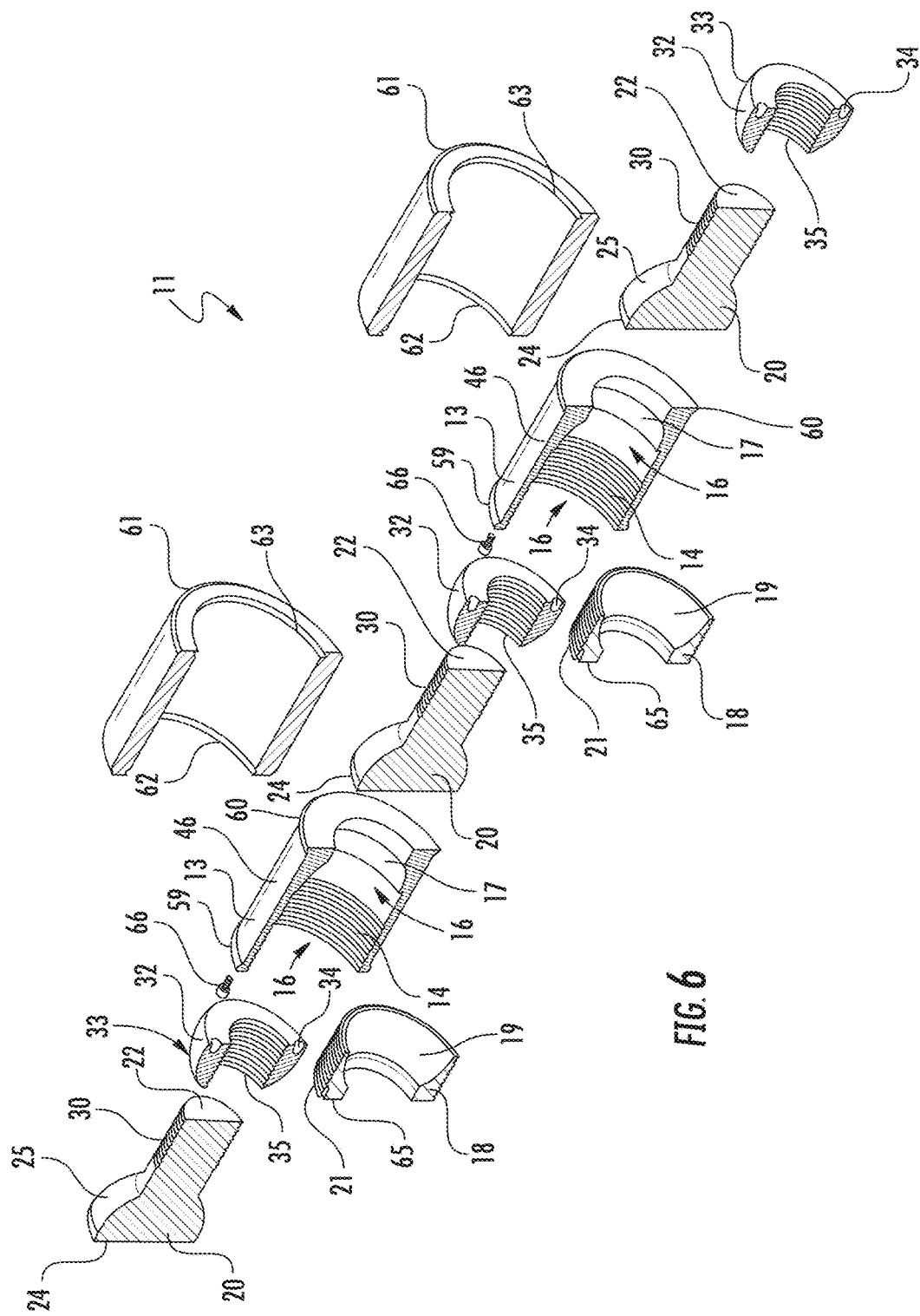
FIG. 6 is an exploded perspective view of an alternate embodiment of the apparatus of the present invention.
Figure 7:
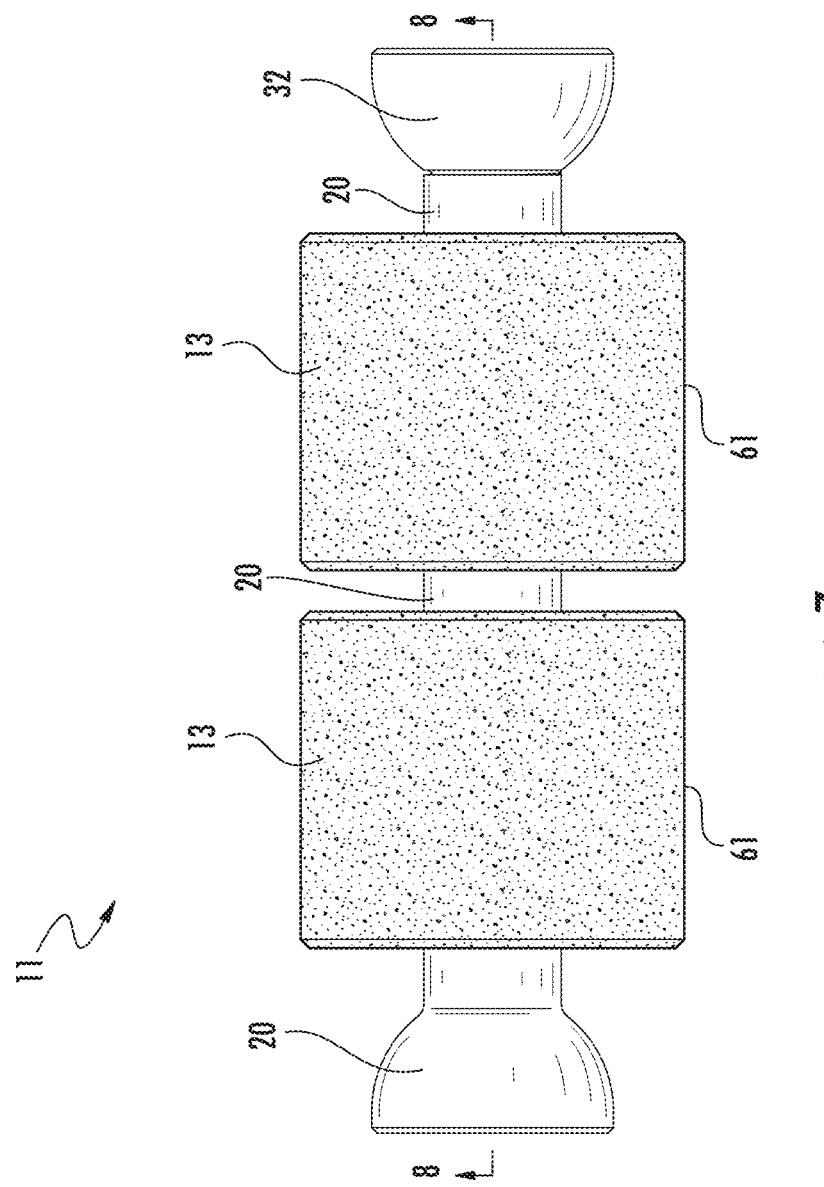
FIG. 7 is a partial elevation view of an alternate embodiment of FIG. 6.

Referring to FIGS. 3A, 3B, 4A, and 4B, operation of the cutter will now be described in relation to a salvage operation to remove submersed shipwreck 42. FIG. 4A illustrates vertical operation of the cutter, while FIG. 4B illustrates horizontal operation of the cutter. A liftboat having an actuator 40 is coupled to cutter 10 via shackle 38 and tether 44, or any other means known in the art. Cutter 10 has been deployed underneath shipwreck 42, as illustrated in FIG. 4, and will accomplish the cutting in the upward direction. In the alternative, cutter 10 may be placed atop a desired structure, such as when the structure is floating atop the water surface or located on land, and cutting is accomplished downwardly. Those ordinarily skilled in the art having the benefit of this disclosure realized a variety of objects may be cut in a variety of directions utilizing the present invention. Accordingly, the cutter of the present invention is omnidirectional and may also be employed below mudline or topside.

In yet another alternate embodiment, cutter 10 may be placed around a desired structure 54, and cutting will be achieved in a horizontal direction, as illustrated in FIG. 4B. Referring to FIG. 4B, lines 44 are attached to a barge 50 on one end and a liftboat, as previously described, on the other end. An anchor or clump weight 48 is positioned underwater and fitted with a sheave to make the system cut in a horizontal direction, as illustrated.

Further referring to FIGS. 3A, 3B, 4A, and 4B, actuator 40 actuates cutter 10 in a back and forth saw-like motion to effect cutting of shipwreck 42. During cutting, bushings 12 articulate in relation to one another, thus allowing cutter 10 to bend around the body of shipwreck 42. As cutter 10 is actuated, it begins to cut into, and eventually through, shipwreck 42. Those ordinarily skilled in the art having the benefit of this disclosure realize the actuation speed and/or dimensions or cutting surface of bushings 12 may be varied to effect varying cutting efficiencies.

As shown in the exemplary embodiment of FIG. 3A, washers 26 are comprised of a flexible material which compresses as bushings 12 bend toward one another, thereby allowing bushings 12 to articulate up to an angle $\Phi$ in relation to each other. In this exemplary embodiment, $\Phi=12°$, therefore illustrating a total cutter angle of 60°. However, those ordinarily skilled in the art having the benefit of this disclosure realize $\Phi$ may be larger or smaller dependent upon whether washer 26 is utilized and, if so, what material comprises washer 26. In addition, the dimensions of bushings 12, convex shouldered bolt 10, and concave interior socket 18 may be varied to effect varying ranges of articulation, as would also be understood by one of ordinary skill in the art having the benefit of this disclosure.

Accordingly, an exemplary embodiment of the present invention provides a cutting apparatus comprising a plurality of bushings, each bushing having a bore therethrough; a concave interior socket coupled to both ends of the bores of each of the plurality of bushings; and a bolt joining adjacent bushings, the bolt having a convex shouldered end and a cylindrical end, the convex shouldered end being seated inside the concave interior socket while the cylindrical end of the bolt is coupled to a convex nut, the convex nut being seated inside the concave interior socket of the adjacent bushing, wherein the plurality of bushing are configured to articulate in relation to one another. In another embodiment, the cutting apparatus further comprising a washer placed between the plurality of bushings, the washer located around the bolt joining adjacent bushings. In yet another exemplary embodiment, at least one of the washers is rigid and at least one of the washers is flexible. In another exemplary embodiment, the cutting apparatus comprises a washer placed between less than all of the plurality of bushings.

An exemplary cutter may further comprise pin holes located on an outer surface of the concave interior socket. In the alternative, teeth are located on an outer surface of the bushings. In yet another embodiment, the teeth of adjacent bushings are oriented in opposing directions. The outer surface of the cutting apparatus may be comprised of tungsten carbide, diamond, or polycrystalline diamond compact cutting structure. In yet another exemplary embodiment, the cutting apparatus further comprises an outermost bushing on each end of the cutting apparatus, each outermost bushing comprising a convex shouldered bolt extending outwardly from the cutting apparatus, a cylindrical end of the convex shouldered bolt being coupled to a mechanism which actuates the cutting apparatus in a back and forth saw-like motion.

Another exemplary embodiment of the present invention provides a cutting apparatus comprising a plurality of bushings, each bushing having a bore therethrough; and a bolt joining adjacent bushings, the bolt extending into a portion of the bore of the adjacent bushings, wherein the plurality of bushing are configured to articulate in relation to one another. In another exemplary embodiment, the cutting apparatus further comprises a washer placed between the plurality of bushings or a washer placed between less than all of the plurality of bushings. In yet another embodiment, an outer surface of the plurality of bushings comprises a milled or clad structure.

An exemplary methodology of the present invention provides a method for cutting a structure, the method comprising the steps of bringing a cutting apparatus into contact with the structure, the cutting apparatus comprising a plurality of bushings, each bushing having a bore therethrough, and a bolt joining adjacent bushings, the bolt extending into a portion of the bore of the adjacent bushings; actuating the cutting apparatus along the structure; and cutting the structure using the cutting apparatus. In another exemplary methodology, the step of actuating the cutting apparatus comprises the step of articulating the plurality of bushings in relation to one another. In yet another methodology, the step of bringing the cutting apparatus into contact with the structure further comprises the step of placing a washer between the plurality of bushings. In yet another exemplary methodology, at least one of the washers is flexible and at least one of the washers is rigid.

In another exemplary methodology, the step of bringing the cutting apparatus into contact with the structure further comprises the step of placing a washer between less than all of the plurality of bushings. In another methodology, the step of bringing the apparatus into contact with the structure comprises the step of providing teeth on an outer surface of the plurality of bushings, the teeth on adjacent bushings being oriented in opposing directions, and the step of actuating the cutter further comprises the step of actuating the cutting apparatus in a back and forth saw-like motion, the cutting apparatus cutting the structure in both the back and forth motion. In yet another exemplary methodology, the step of bringing the cutting apparatus into contact with the structure further comprises the step of providing a clad outer surface on the plurality of bushings.

Accordingly, various embodiments of the present invention provide a cutter having interlocking, articulating bushings. In instances where the cutter breaks during operation, the bushings will not be lost in the sea or require costly retrieval operations since they are interlocked. Moreover, the cutter can be quickly reassembled using the pin holes of the present invention. Furthermore, unlike the conventional chain cutters, the present invention allows for precision cutting of a structure.

FIGS. 6-18 show an alternate embodiment of the apparatus of the present invention, designated generally by the numeral 11. Cutter apparatus 11 employs a plurality of bushings 13. As with the embodiments of FIGS. 1-5, bushing 13 can be generally cylindrically shaped having inner bore 16 with threads or threaded portion 14. Bushings 13 each have an interior concave socket 18.

Figure 8:
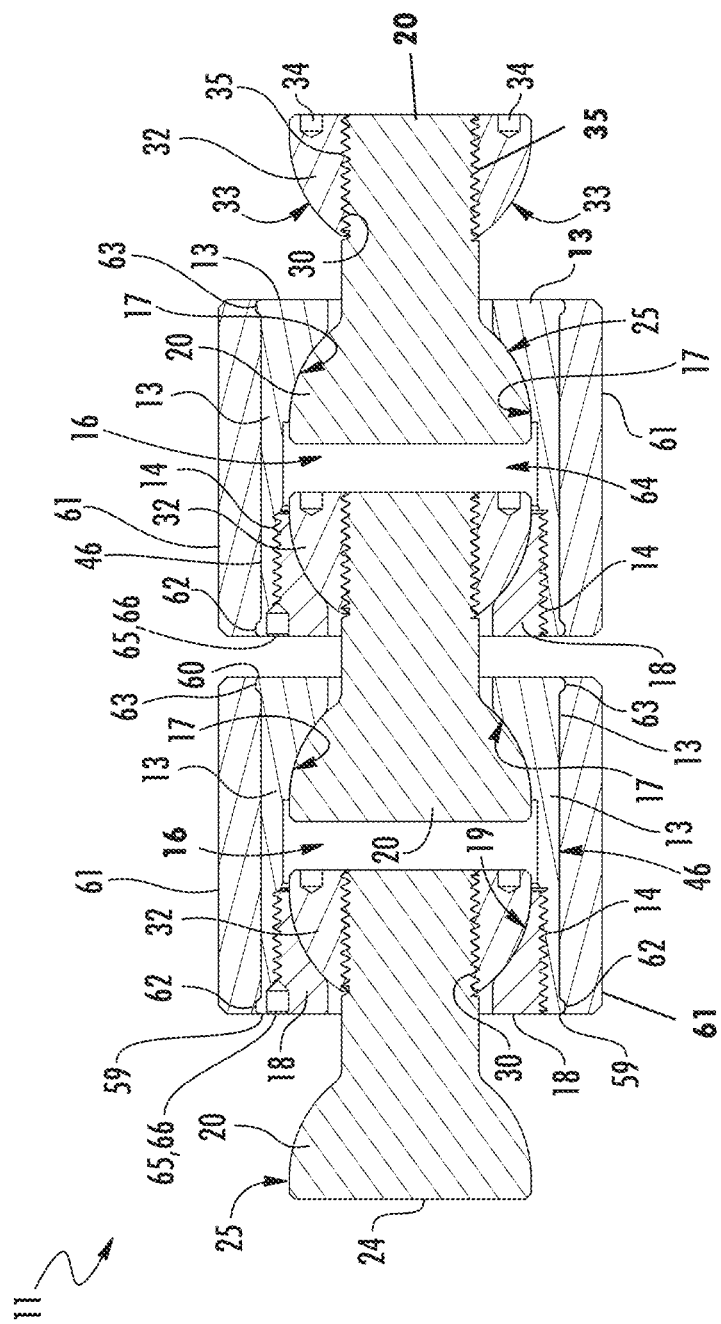
FIG. 8 is a partial sectional view of an alternate embodiment of FIG. 6 taken along lines 8-8 of FIG. 7.
Figure 9:
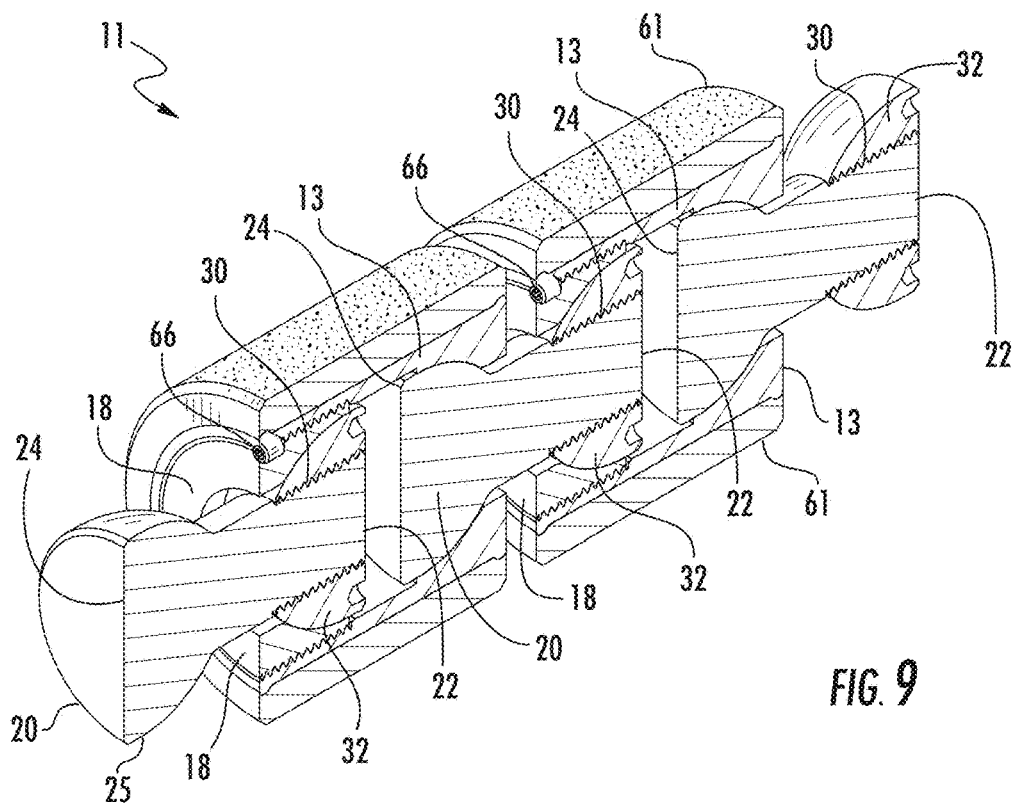
FIG. 9 is a partial perspective sectional view of an alternate embodiment of FIG. 6.
Figure 10:
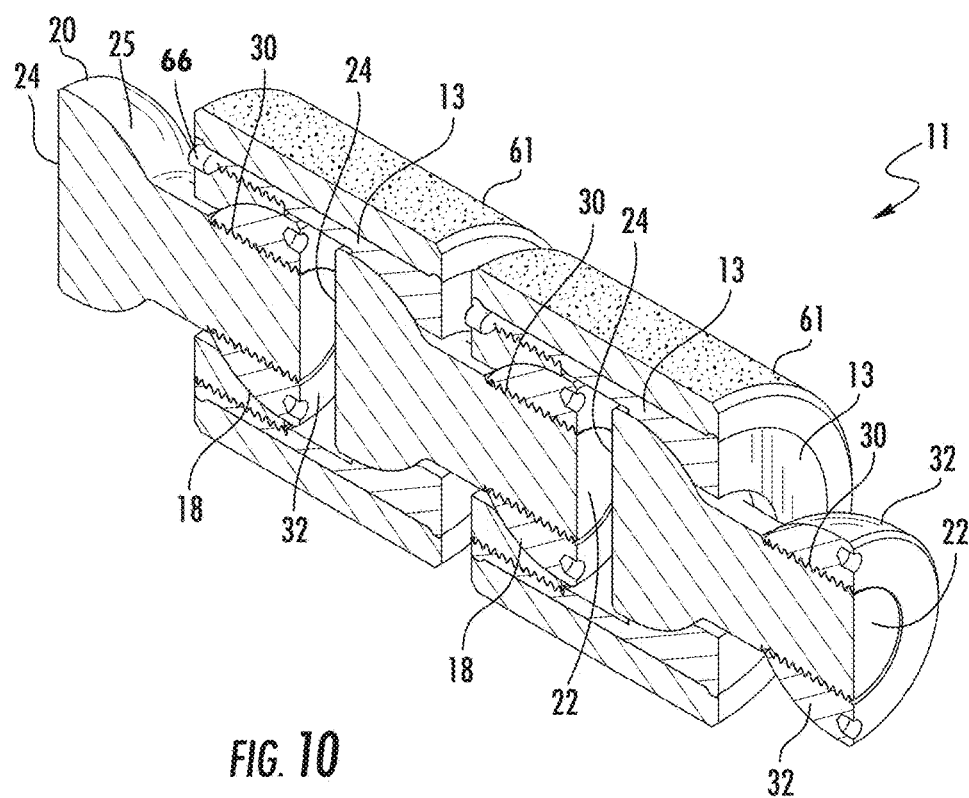
FIG. 10 is a partial perspective sectional view of an alternate embodiment of FIG. 6.
Figure 11:
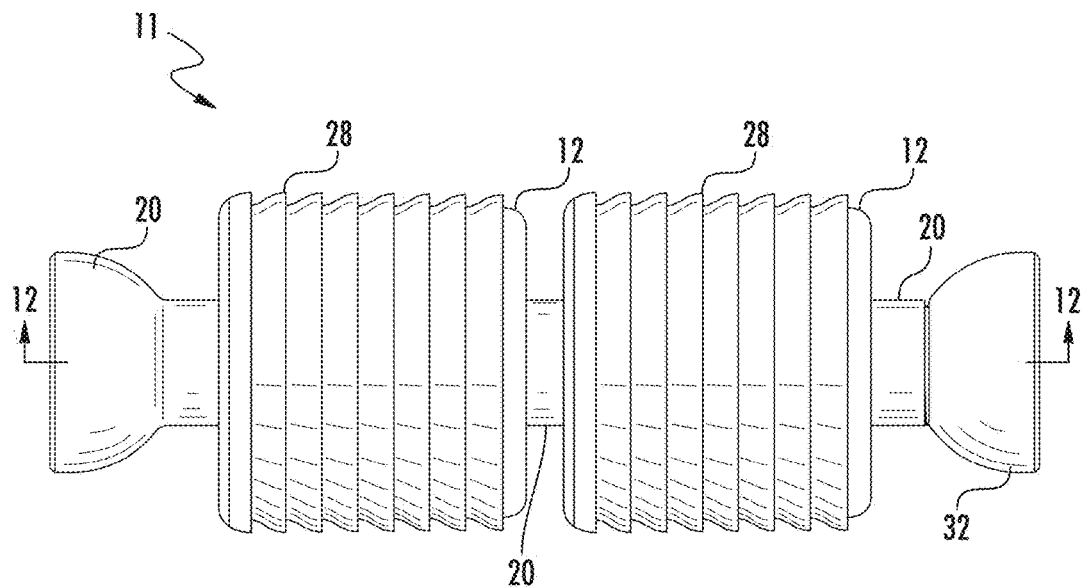
FIG. 11 is a partial elevation view of an alternate milled embodiment of FIG. 6 wherein teeth are provided instead of cladding.
Figure 12:
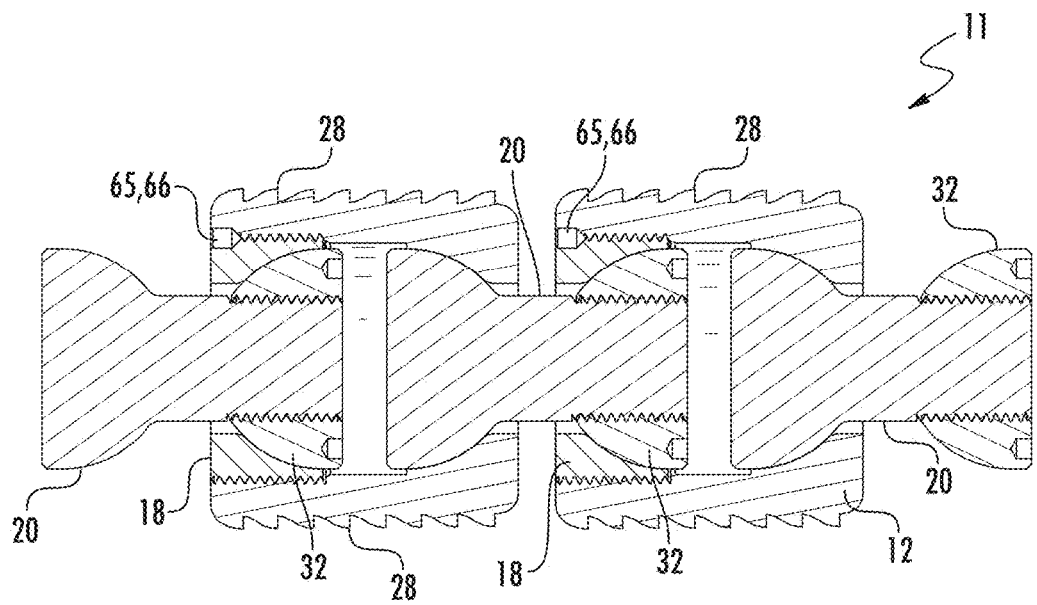
FIG. 12 is a partial sectional view of an alternate milled embodiment of FIG. 6 wherein teeth are provided instead of cladding.
Figure 13:
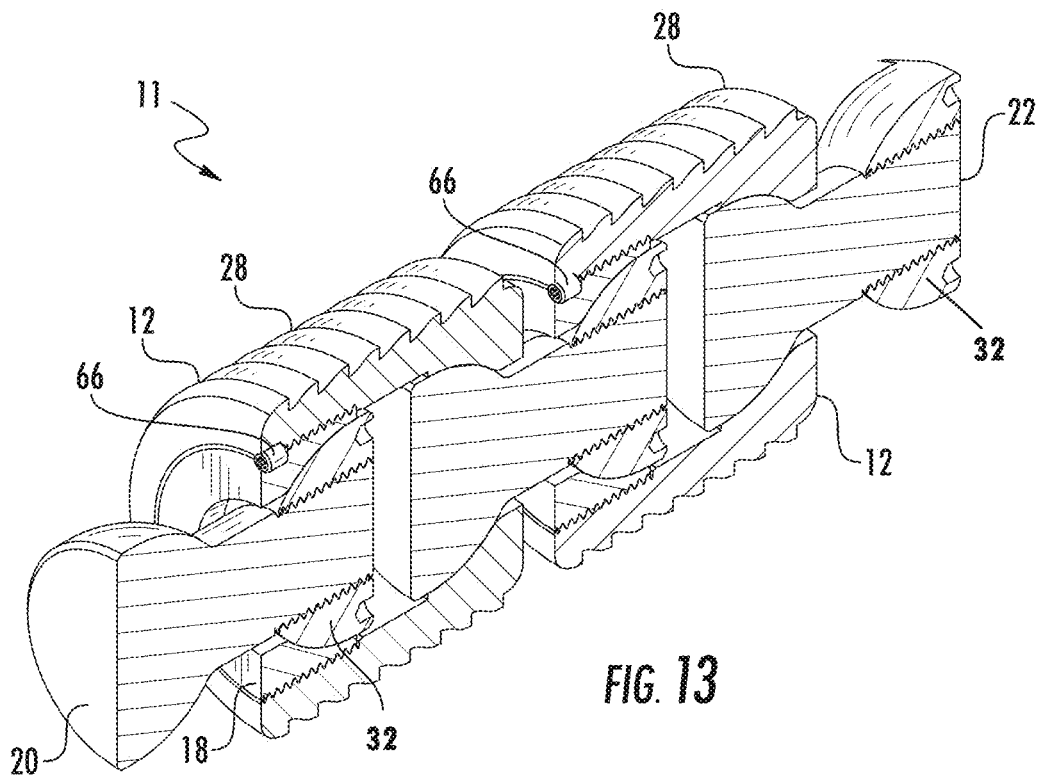
FIG. 13 is a partial perspective sectional view of an alternate embodiment of FIGS. 11-12.
Figure 14:
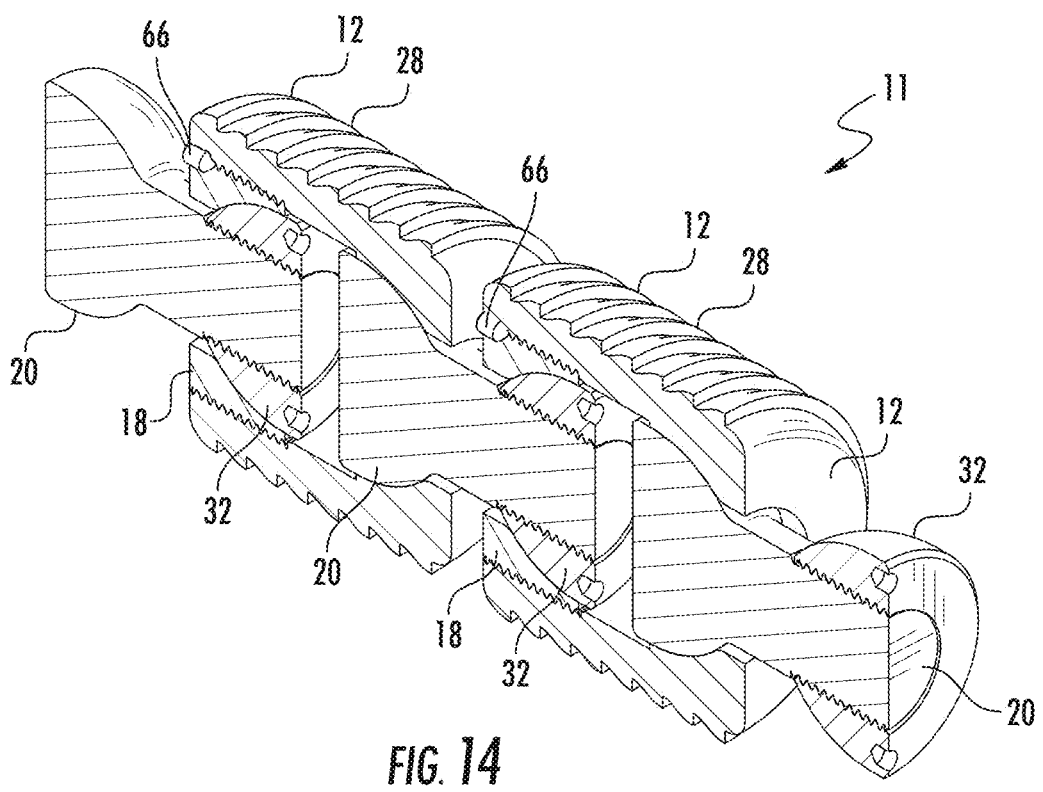
FIG. 14 is a partial perspective sectional view of an alternate embodiment of FIGS. 11-12.
Figure 15:
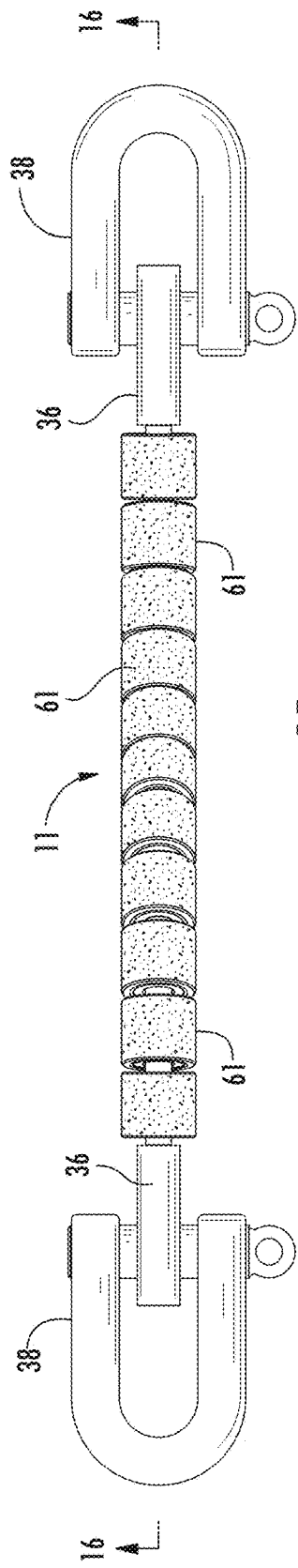
FIG. 15 is a plan view of an alternate embodiment.
Figure 16:
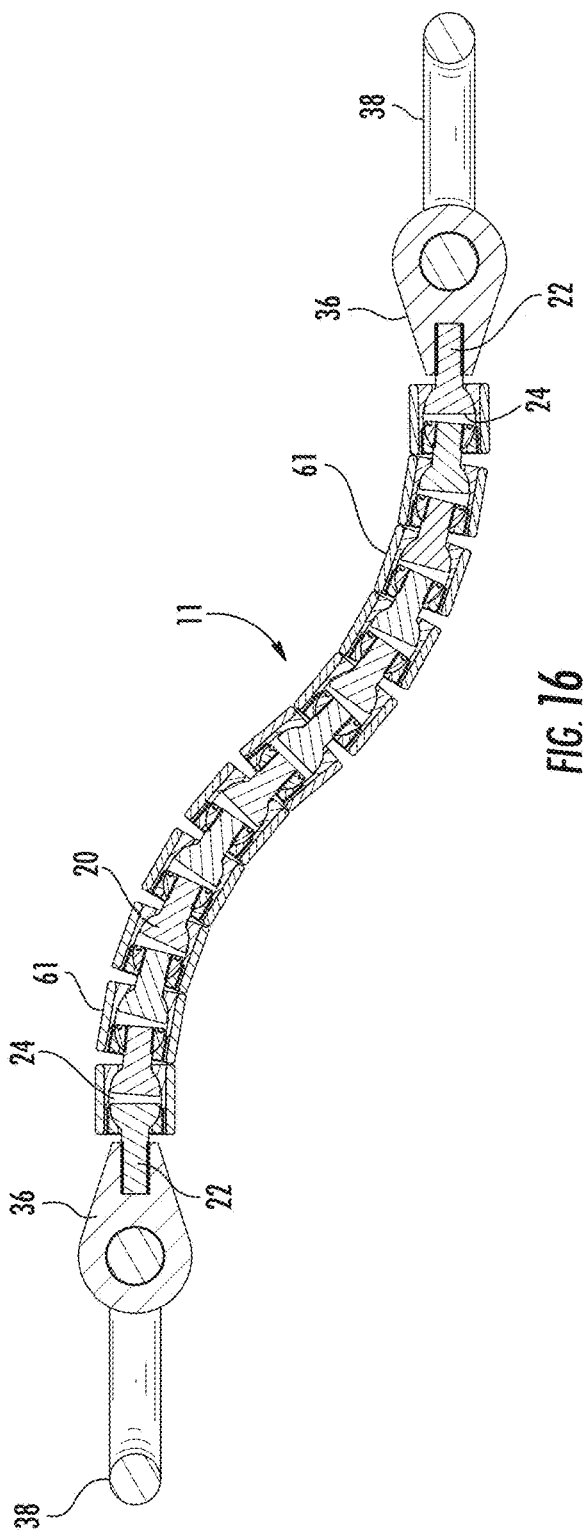
FIG. 16 is a sectional view taken along lines 16-16 of FIG. 15.

FIGS. 6-10 show cutter or cutter apparatus 11 wherein each bushing 13 has an outer generally cylindrically shaped surface 46 in between annular ribs 59, 60. Abrasive cladding sleeve 61 can be generally cylindrically shaped, conforming to surface 46 and extending to each rib 59, 60. Annular grooves 62, 63 on abrasive cladding sleeve 61 can be sized and shaped to conform to a rib 59 or 60 as seen in FIG. 8. In the alternative embodiment of FIGS. 6-18, cladding sleeve 61 may comprise a variety of clad cutting surfaces, such as tungsten carbide, polycrystalline diamond compact, diamond, or other cutting surfaces, or some combination of cutting surfaces.

Socket 18 connects to bushing 13 with a threaded connection wherein threads 21 of socket 18 connect with threads 14 of bushing 13. Cylindrical end 22 of convex shouldered bolt 20 has threads 30 that connect with internal threads 35 of convex nut 32. Convex surface 33 of nut 32 engages correspondingly shaped concave surface 19 of socket 18.

Bushing 13 has concave surface 17 that is receptive of convex surface 25 of bolt 20. A gap 64 is provided in between each convex nut 32 and bolt 20. Convex end 24 of convex shouldered bolt 20, as well as the inner end of convex nut 32, also comprise pin holes 34 which are utilized with a pin wrench in assembly/disassembly. At the threaded connection that joins bushing 13 to socket 18 (namely internal threads 14 of bushing 13 connects to external threads 21 of socket 18), a bore 65 such as a cylindrically shaped internally threaded bore 65 is receptive of threaded member 66 (e.g., allen screw or other suitable pin or fastener) (see FIGS. 8-10). Alternatively, bore 65 could not be internally threaded, and could be fitted with a correspondingly shaped pin or other locking member. The member 66 prevents rotation of socket 18 relative to bushing 13 thus disallowing any disassembly during use. Bore 65 thus extends into both bushing 13 and socket 18. For example, half of bore 65 can be milled from bushing 13. The other half of bore 65 can be milled from socket 18. Thus when pin or screw or fastener 66 occupies bore 65, parts 13 and 18 are unable to be dismantled until the pin, screw or fastener is removed. If a pin is used for part 66, it could form an interference fit with bore 65 or be secured in bore 65 with adhesive, tack weld or other means.

FIGS. 11-14 are similar to the embodiments of FIGS. 1-10, but provide bushing 12 having teeth 28 (as with FIGS. 1-5E) and locking pin or fastener 66 occupying bore 65 as with FIGS. 6-10.

Figure 17:
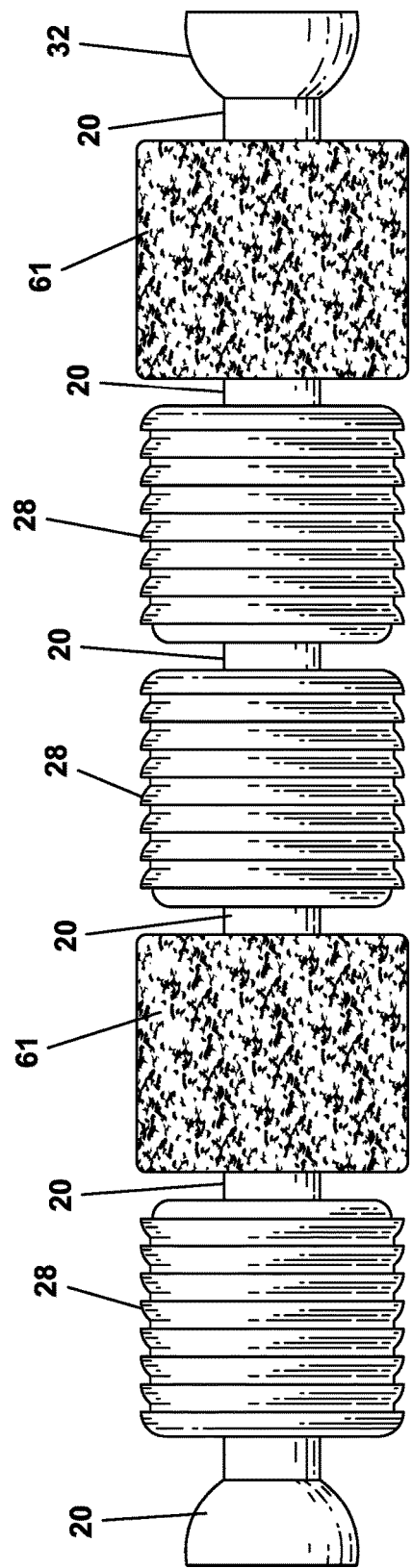
FIGS. 17 and 18 are elevation views of an alternate embodiment providing bushings with milled and clad structures.
Figure 18:
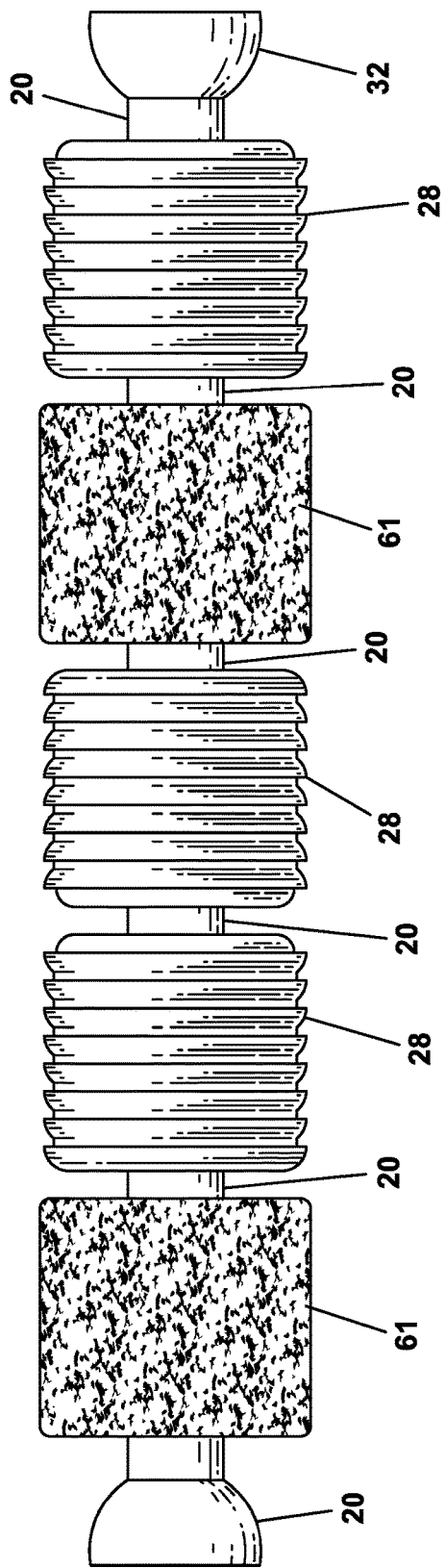

As described herein, in various embodiments an outer surface of the plurality of bushings can comprise a milled structure while in other embodiments an outer surface of the plurality of bushings can comprise a clad structure. In yet other embodiments, an outer surface of one or more of the plurality of bushings can comprise a clad structure and also an outer surface of one or more of the plurality of bushings can comprise a milled structure, as seen in FIGS. 17 and 18.

In various embodiments, the clad structure can be applied to the plurality of bushings via welding and high heat, e.g., 1600 degrees Fahrenheit, wherein a portion of the bushing, e.g., if metal, melts and the clad structure is left embedded in the bushing surface.

Although various embodiments have been shown and described, the invention is not limited to such embodiments and will be understood to include all modifications and variations as would be apparent to one skilled in the art. For example, although described only in relation to marine salvage operations, the cutter of the present invention may be used to cut a variety of other structures and objects. Therefore, it should be understood that the invention is not intended to be limited to the particular forms disclosed. Rather, the intention is to cover all modifications, equivalents and alternatives falling within the spirit and scope of the invention as defined by the appended claims.

PARTS LIST

The following is a list of parts and materials suitable for use in the present invention:

Parts Number Description
10 cutter/cutter apparatus
11 cutter/cutter apparatus
12 bushing
13 bushing
14 thread/internally threaded portion
16 inner bore
17 annular concave surface
18 socket/interior concave socket
19 concave annular surface
20 convex shouldered bolt
21 threads
22 cylindrical end
24 convex end
25 convex outer surface
26 washer
28 teeth
30 threads/externally threaded portion
32 convex nut
33 convex surface
34 pin hole
35 internally threaded portion
36 pad eye receiver
38 shackle/clevis
40 actuator
42 shipwreck
44 tether
46 cylindrical outer surface
48 anchor/clump weight
50 barge
54 structure
59 annular rib
60 annular rib
61 cladding sleeve/cladding
62 annular groove
63 annular groove
64 gap
65 bore
66 pin/screw/fastener All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A cutting apparatus comprising:
   a) an elongated cutting cable having a plurality of bushings, each bushing having a bore therethrough;
   b) a concave interior socket coupled to both ends of the bores of each of the plurality of bushings;
   c) a bolt joining adjacent bushings, the bolt having a convex shouldered end and a cylindrical end, the convex shouldered end being seated inside the concave interior socket while the cylindrical end of the bolt is coupled to a convex nut, the convex nut being seated inside the concave interior socket of the adjacent bushing;
   d) wherein the plurality of bushing are configured to articulate in relation to one another; and
   e) wherein the ends of the cutting cable are configured to attach to lines that enable the cable to be moved in selected directions during cutting.

2. A cutting apparatus as defined in claim 1, the cutting apparatus further comprising a washer placed between the plurality of bushings, the washer located around the bolt joining adjacent bushings.

3. A cutting apparatus as defined in claim 2, wherein at least one of the washers is rigid and at least one of the washers is flexible.

4. A cutting apparatus as defined in claim 1, the cutting apparatus comprising a washer placed between less than all of the plurality of bushings.

5. A cutting apparatus as defined in claim 1, the cutting apparatus further comprising pin holes located on an outer surface of the concave interior socket.

6. A cutting apparatus as defined in claim 1, the cutting apparatus further comprising teeth located on an outer surface of the bushings.

7. A cutting apparatus as defined in claim 6, wherein the teeth of adjacent bushings are oriented in opposing directions.

8. A cutting apparatus as defined in claim 1, the cutting apparatus further comprising a tungsten carbide, diamond, or polycrystalline diamond compact cutting structure on an outer surface of the plurality of bushings.

9. A cutting apparatus as defined in claim 1, further comprising an outermost bushing on each end of the cutting apparatus, each outermost bushing comprising a convex shouldered bolt extending outwardly from the cutting apparatus, a cylindrical end of the convex shouldered bolt being coupled to a mechanism which actuates the cutting apparatus in a back and forth saw-like motion.

10. A cutting apparatus comprising:
    a) an elongated cutter cable that includes a plurality of bushings, each bushing having a bore therethrough, said bore having an internally threaded portion and a concave portion;
    b) a socket coupled with a threaded connection to the internally threaded portion of the bore of each of the plurality of bushings;
    c) a bolt joining adjacent bushings, the bolt having a convex shouldered end and an externally threaded end, the convex shouldered end being seated inside the socket, wherein the externally threaded end of the bolt is coupled to a convex nut, the convex nut being seated inside the socket of the adjacent bushing, wherein the plurality of bushings are configured to articulate in relation to one another;
    d) a pin that prevents relative rotation of the bushing relative to the socket after the bushing and socket are connected at said threaded connection; and
    e) wherein the ends of the cutting cable are configured to attach to lines that enable the cable to be moved in selected directions during cutting.

11. A cutting apparatus as defined in claim 10, the cutting apparatus further comprising a washer placed between the plurality of bushings, the washer located around the bolt joining adjacent bushings.

12. A cutting apparatus as defined in claim 11, wherein the washers are placed between less than all of the plurality of bushings and comprise a combination of rigid and flexible washers.

13. A cutting apparatus as defined in claim 10, the cutting apparatus comprising a washer placed between less than all of the plurality of bushings.

14. A cutting apparatus as defined in claim 10, the cutting apparatus further comprising pin holes located on an outer surface of the socket.

15. A cutting apparatus as defined in claim 10, the cutting apparatus further comprising cladding located on an outer surface of the bushings.

16. A cutting apparatus as defined in claim 15, wherein the cladding is comprised of tungsten carbide, diamond, or polycrystalline diamond.

17. A cutting apparatus as defined in claim 10, the cutting apparatus further comprising a tungsten carbide, diamond, or polycrystalline diamond compact cutting structure on an outer surface of the plurality of bushings.

18. A cutting apparatus as defined in claim 10, further comprising an outermost bushing on each end of the cutting apparatus, each outermost bushing comprising a convex shouldered bolt extending outwardly from the cutting apparatus, a cylindrical end of the convex shouldered bolt being coupled to a mechanism which actuates the cutting apparatus in a back and forth saw-like motion.

19. A cutting apparatus comprising:
    a) an elongated cutter cable that includes a plurality of bushings, each bushing having a bore therethrough;
    b) a socket coupled to one end of the bore;
    c) a bolt and nut extending to adjacent bushings, the bolt and nut extending into a portion of the bore of the adjacent bushings, wherein the plurality of bushings are configured to articulate in relation to one another;
    d) each socket connected to a bushing with a threaded connection;
    e) each nut connected to the bolt with a threaded connection;
    f) a concave and convex interface that joins each said bolt to a said bushing and each nut to a said socket; and
    g) wherein the ends of the cutting cable are configured to attach to lines that enable the cable to be moved in selected directions during cutting.

20. A cutting apparatus as defined in claim 19, the cutting apparatus further comprising a washer placed between the plurality of bushings.

21. A cutting apparatus as defined in claim 19, the cutting apparatus further comprising a washer placed between less than all of the plurality of bushings.

22. A cutting apparatus as defined in claim 19, wherein an outer surface of the plurality of bushings comprises a milled or clad structure.

23. A cutting apparatus as defined in claim 19, wherein an outer surface of the plurality of bushings comprises a milled structure.

24. A cutting apparatus as defined in claim 19, wherein an outer surface of the plurality of bushings comprises a clad structure.

25. A cutting apparatus as defined in claim 19, wherein an outer surface of one or more of the plurality of bushings comprises a clad structure, and an outer surface of one or more of the plurality of bushings comprises a milled structure.

\* \* \* \* \*